(12) United States Patent
Buckley

(10) Patent No.: US 7,680,348 B2
(45) Date of Patent: Mar. 16, 2010

(54) SYSTEM AND METHOD FOR COMPRESSING AND SCALING IMAGES

(75) Inventor: Robert Roy Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 865 days.

(21) Appl. No.: 11/490,642

(22) Filed: Jul. 21, 2006

(65) Prior Publication Data

US 2008/0019599 A1    Jan. 24, 2008

(51) Int. Cl.
*G06K 9/46*    (2006.01)
(52) U.S. Cl. .................. 382/240; 382/248; 382/298; 375/240.18; 375/240.19
(58) Field of Classification Search .............. 382/240, 382/248, 298; 375/240.19
See application file for complete search history.

(56) References Cited

U.S. PATENT DOCUMENTS

| | | | |
|---|---|---|---|
| 6,442,298 B1* | 8/2002 | Nixon | 382/248 |
| 7,031,534 B2 | 4/2006 | Buckley | |
| 7,095,907 B1* | 8/2006 | Berkner et al. | 382/298 |
| 2002/0000998 A1* | 1/2002 | Scott et al. | 345/667 |
| 2003/0081842 A1 | 5/2003 | Buckley | |
| 2003/0135649 A1 | 7/2003 | Buckley et al. | |
| 2004/0208379 A1* | 10/2004 | Kodama et al. | 382/232 |

OTHER PUBLICATIONS

David Taubman and Robert Prandolini Architecture, Philosophy and Performance of JPIP: Internet Protocol Standard for JPEG2000 SPIE 2003.*
David Taubman Proposal and implementation of JPIP KakaduSoftware 2002.*
Justin Ridge Efficient transform-domain size and resolution reduction of images Elsevier 2003.*
Tamas Frajka Image Coding Subject to Constraints University of California, San Diego 2003.*
David S. Taubman, JPEG2000: image compression fundamentals, standards, and practice, Kluwer 2002.*
Abrams, "Automated Migration for Image Preservation", *Society for Imaging Science and Technology*, Final Program and Proceedings, Archiving (2006).
"Archive Ingest and Handling Test (AIHT)", *Final Report of the Harvard Univ. Library*, (2005).

* cited by examiner

*Primary Examiner*—Wesley Tucker
*Assistant Examiner*—Mark Roz
(74) *Attorney, Agent, or Firm*—Carter, DeLuca, Farrell & Schmidt, LLP

(57) ABSTRACT

A system and method for compressing digital images is provided. The method includes receiving an input image having a dimension d and a target dimension constraint $d_t$, and determining a number of resolution levels R for generating an image having corresponding dimension $d_r$. The difference between $d_r$ and $d_t$ is less than the difference between $d_r$ and the corresponding dimension of an image compressed at the next or the previous resolution level. The method additionally includes determining the scale factor S as a function of R and the dimension d of the input image, and scaling the input image in accordance with the scale factor S. The method further includes compressing the scaled input image with the R resolution levels for producing a compressed image including a lowest resolution image. The lowest resolution image has a corresponding dimension that is substantially the same as $d_t$.

21 Claims, 4 Drawing Sheets

SYSTEM AND METHOD FOR COMPRESSING AND SCALING IMAGES

BACKGROUND

The present disclosure relates generally to image compression. In particular, the present disclosure relates to determining the number of resolution levels, and scaling compressed images to fit a target size.

In a hierarchical image compression software tool, such as JPEG2000, image compression is performed using multiple resolution levels in a hierarchical fashion that allows decoding to a lower resolution. An original image is wavelet transformed to create four first subband images which replace the original image and may be used to recreate the original image. FIG. 1 shows a representation of an image that was compressed with two resolution levels of compression. The first four subbands are LL1, LH1, HL1 and HH1.

One of the first subbands (e.g., LL1) is wavelet transformed to create four second subband images, shown in FIG. 1 as LL2, LH2, HL2 and HH2, which are capable of replacing the first subband that was wavelet transformed (e.g., LL1). The process of using wavelet transformation to transform successive subband images (LL images) may be continued, with each wavelet transformation corresponding to a resolution level of compression, where the JPEG2000 standard allows up to 32 resolution levels. JPEG2000 creates a compressed image by quantizing and entropy encoding the subband images.

A compressed image is decompressed by a JPEG2000 decoder software module for displaying the image at one of the available resolution levels. For example, to display an image that is $1/16^{th}$ the size of the original image, the JPEG2000 decoder accesses and decompresses just the LL2 subband. To display an image that is $1/4^{th}$ the size of the original image, the JPEG2000 decoder accesses and decompresses the LH2, HL2 and HH2 subband images and combines them with the LL2 subband image to recreate the LL1 subband image.

The dimensions (e.g., number of pixels per line (width (W)) and number of lines (height (H))) of each subband image depend on the corresponding dimensions of the original image. The number of resolution levels is determined manually so that a lowest resolution image (e.g., a thumbnail) having target dimensions can be generated for a first original image having a typical size, e.g., the dimensions of a page. Accordingly, if a second original image having an atypical size is compressed using the same number of resolution levels as was determined above, the dimensions of a lowest resolution image generated for the second original image will have dimensions that are different from the dimensions of the lowest resolution image generated for the first original image. If a constraint exists for the size of the lowest resolution image generated for the second original image, e.g., to be sized the same as the thumbnail size used above, the number of resolution levels must be determined anew.

Furthermore, in various applications, even when the original image is always of a standard size, the constraints for the size of the lowest resolution image may vary for the different applications. The number of resolution levels must be determined for each case, bearing in mind that providing extra resolution levels is undesirable due to the strain they can place on available resources. Additionally, since a compressed image is always $1/4$ the size of an image of the next highest resolution level, it might be impossible for the lowest resolution image to have a specified target dimension To overcome the drawbacks in the prior art, it is an aspect of the present disclosure to provide a system and method for automatically determining the number of resolution levels to use when compressing an original image that is appropriate for a variety of applications, including generating a target image that is sized to substantially meet a dimension constraint.

SUMMARY

The present disclosure is directed to a method for compressing digital images including receiving an input image having a dimension d and a target dimension constraint $d_t$, and determining a number of resolution levels R for generating an image having corresponding dimension $d_r$. The difference between $d_r$ and $d_t$ is less than the difference between $d_r$ and the corresponding dimension of an image compressed at the next or the previous resolution level. The method additionally includes determining the scale factor S as a function of R and the dimension d of the input image, and scaling the input image in accordance with the scale factor S. The method further includes compressing the scaled input image with the R resolution levels for producing a compressed image including a lowest resolution image. The lowest resolution image has a corresponding dimension that is substantially the same as $d_t$.

The present disclosure is also directed to a processor assembly for compressing digital images. The processor assembly includes a processor; and an image compression server module having a series of programmable instructions executable by the processor for receiving an input image having a dimension d and a target dimension constraint $d_t$. The image compression server module includes a module having a series of programmable instructions executable by the processor for determining a number of resolution levels R for generating an image having corresponding dimension $d_r$. The difference between $d_r$ and $d_t$ is less than the difference between $d_r$ and the corresponding dimension of an image compressed at the next or the previous resolution level. The image compression server module further includes modules having a series of programmable instructions executable by the processor for determining the scale factor S as a function of R and the dimension d of the input image and scaling the input image in accordance with the scale factor S; and a module having a series of programmable instructions executable by the processor for compressing the scaled input image with the R resolution levels for producing a compressed image including a lowest resolution image. The lowest resolution image has a corresponding dimension that is substantially the same as $d_t$.

The present disclosure is also directed to a system for compressing digital imaging. The system includes a processor assembly for compressing digital images having a processor, a transaction server module having a series of programmable instructions executable by the processor for receiving from a client device a client request to compress an image, and an image compression server module having a series of programmable instructions executable by the processor for receiving from the transaction server module an input image having a dimension d and a target dimension constraint $d_t$.

The image compression server module includes a module having a series of programmable instructions executable by the processor for determining a number of resolution levels R for generating an image having corresponding dimension $d_r$. The difference between $d_r$ and $d_t$ is less than the difference between $d_r$ and the corresponding dimension of an image compressed at the next or the previous resolution level. The image compression server module further includes modules having a series of programmable instructions executable by the processor for determining the scale factor S as a function of R and the dimension d of the input image and scaling the input image in accordance with the scale factor S. The image compression server module further includes a module having a series of programmable instructions executable by the processor for compressing the scaled input image with the R resolution levels for producing a compressed image including a lowest resolution image. The lowest resolution image has a corresponding dimension that is substantially the same as $d_t$. The compressed scaled image is provided to the transaction server which provides the client device with access to the compressed image.

Other features of the presently disclosed system and method for compressing images will become apparent from the following detailed description, taken in conjunction with the accompanying drawings, which illustrate, by way of example, the presently disclosed system and method for compressing images.

BRIEF DESCRIPTION OF THE DRAWINGS

Various embodiments of the present disclosure will be described below with reference to the figures, wherein.

DETAILED DESCRIPTION

Figure 1:
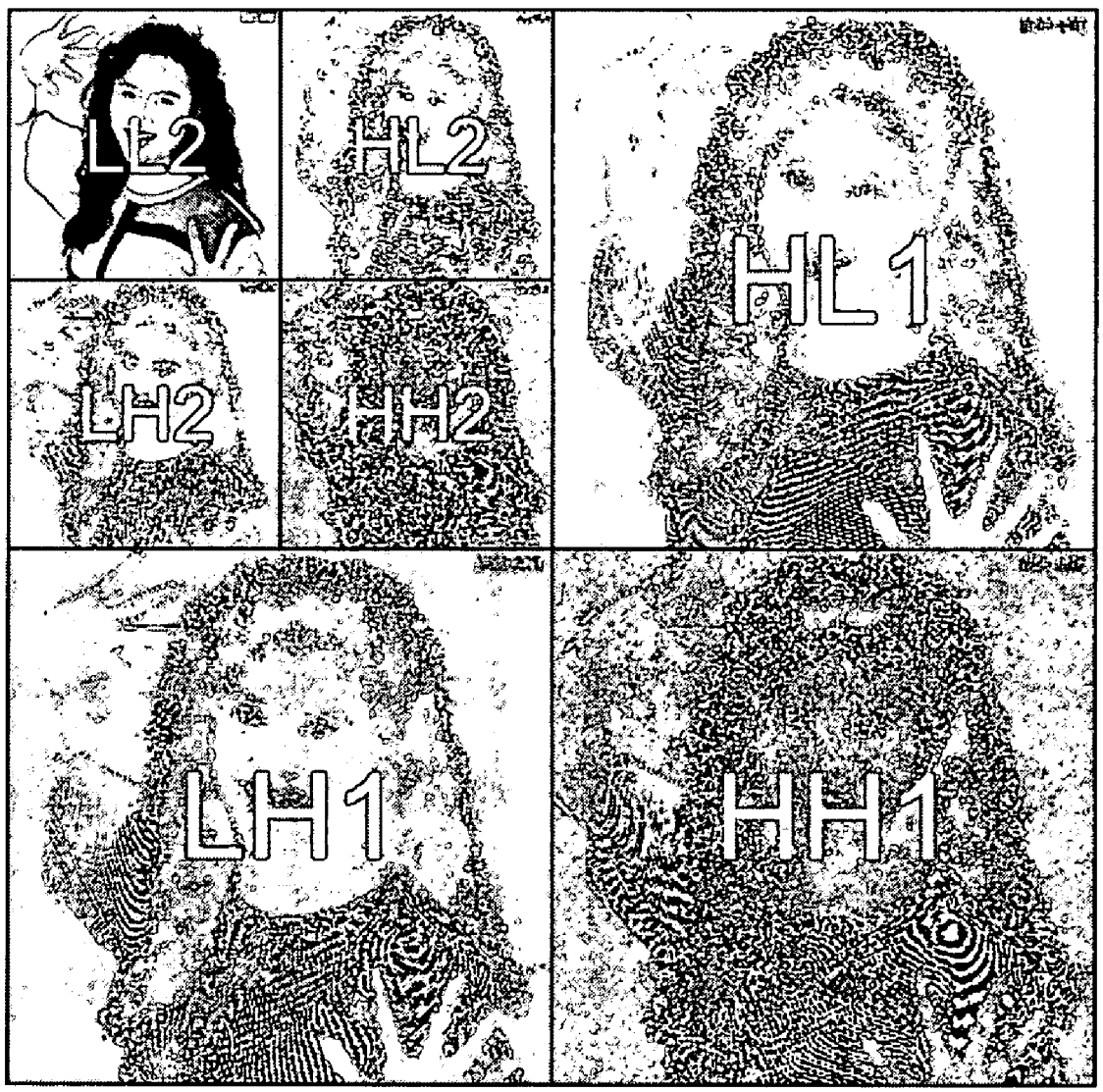
FIG. 1 is a representation of an image that is compressed using prior art wavelet transformation.
Figure 2:
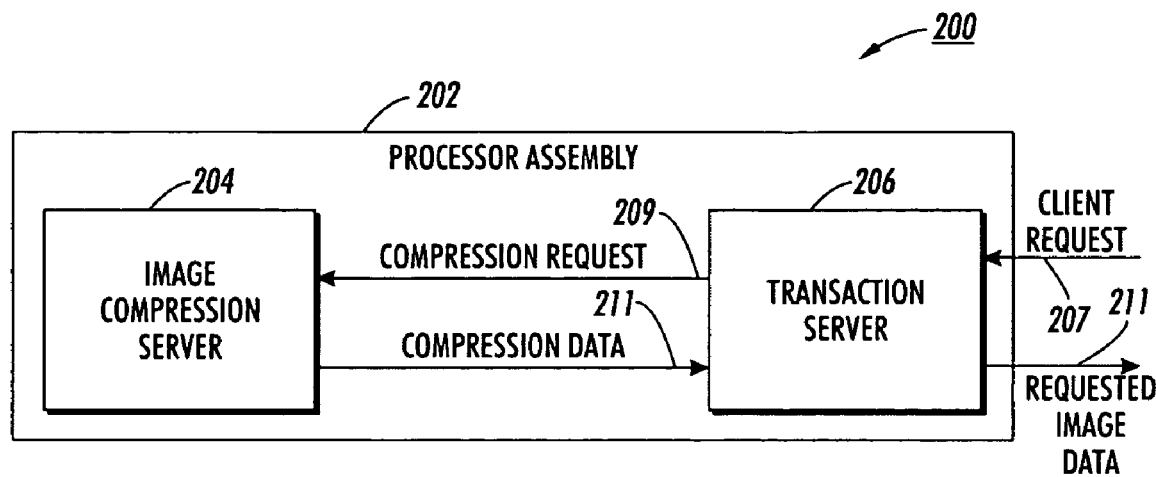
FIG. 2 is a block diagram of an exemplary image compression system.

Referring now to the drawing figures, in which like references numerals identify identical or corresponding elements, the image compression system and method in accordance with the present disclosure will now be described in detail. With initial reference to FIG. 2, an exemplary image compression system in accordance with the present disclosure is illustrated and is designated generally as image compression system 200. Image compression system 200 includes a processor assembly 202 including at least one processor, an image compression server 204 and a transaction server 206.

The image compression server 204 and the transaction server 206 each include a series of programmable instructions capable of being executed by the processor assembly 202. The series of programmable instructions can be stored on a computer-readable medium, such as RAM, a hard drive, CD, smart card, 3.5" diskette, etc., or transmitted via propagated signals for being executed by the processor assembly 202 for performing the functions disclosed herein and to achieve a technical effect in accordance with the disclosure. The functions of the respective servers may be combined into one module or distributed among a different combination of modules.

The transaction server 206 receives a client request 207 to compress an input digital image. The client request 207 may be a request for compressed image data (e.g., including at least one image, each image having different resolution levels) and/or for an extracted image, e.g., wherein the extracted image is a decompressed image of the image data which has the lowest resolution of the different resolution levels. The client request 207 includes the input image or a reference to the input image and target specification data. The target specification data includes information related to at least one dimension of a target image, e.g., the compressed image of the at least one compressed image having the lowest resolution. The transaction server 206 outputs the requested image data, which may be compressed image data and/or an extracted image, as per the client request 207.

The transaction server 206 processes the client request 207 and may retrieve the input image from a source (not shown) (e.g., a storage device, another processing device, etc.), when appropriate. The transaction server 206 provides to the image compression server 204 a compression request 209 including the input image and dimension data. The dimension data includes input dimension data describing at least one dimension of the input image, and target dimension data describing at least one corresponding dimension of the target image. The input dimension data and the target dimension data may be received via the client request 207 or may be determined, such as from the source that the input image was retrieved from, from the input image itself, from a target destination or application that the target image is to be processed by, e.g., a specific printer device or software application. The target destination or application may be described in the target specification data of the client request. When the target dimension data is not provided or available, a predetermined default value is used.

Figure 3:
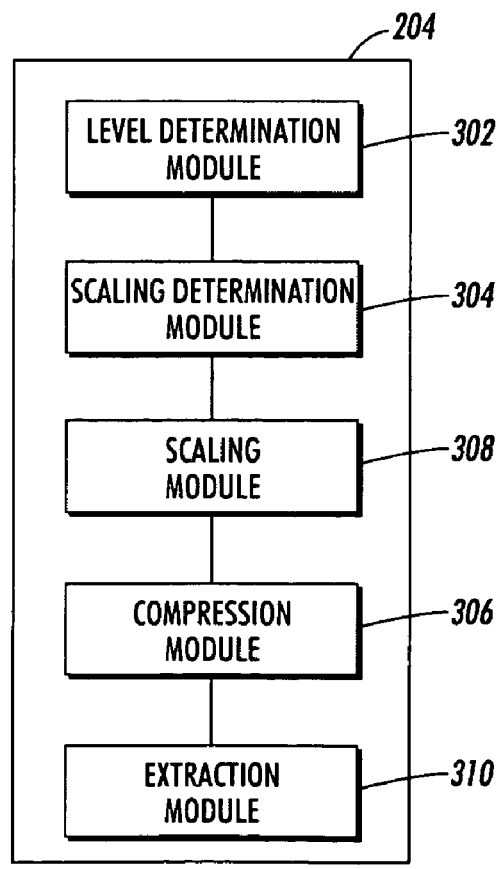
FIG. 3 is a block diagram of an exemplary image compression server of the image compression system shown in FIG. 2.

With reference to FIG. 3, the image compression server 204 is shown to include a level determination module 302, a scaling determination module 304, a compression module 306, a scaling module 308 and an extraction module 310. The level determination module 302 determines the number of resolution levels R to use when compressing the image based on the dimension data. The scaling determination module 304 determines a scaling factor S for sizing the target image to substantially meet the target dimension data. The level variable R is provided by the level determination module 302 to the compression module 306. The compression module 306 compresses the input image (before or after scaling as described below) in accordance with the level variable R. The scaling module 308 receives an image to be scaled from the extraction module 310 or from the transaction server 206 and scales the original input image or an extracted image in accordance with the scaling factor. The scaled image is provided to the compression module 306 or to the transaction server 206, as described further below. The extraction module 310 receives an image to be scaled from the compression module 306, and provides the extracted image to the scaling determination module 304 or the transaction server 206. The scaling determination module 304, scaling module 308 and extraction module 310 are optional.

The compression module 306 receives the compression request 209 including the level variable R, the input image (before or after scaling) and data about the input image, or a combination thereof, and compresses the input image in accordance with the level variable R for generating compressed image data 211 including at least one image, each image having different resolution levels, where the number of resolution levels is R. The series of programming instructions included in compression module 306 are written in an application programming language suitable for image compression. The image compression used may provide for hierarchical resolution levels, wavelet transforms and/or JPEG2000. The output compressed image data 211 is provided to the scaling module 308, or to the transaction server 206 which provides the requested image data 213 to the client. The compression standard used is not limited to JPEG 2000, yet provides for extraction of various resolution versions of an original image at fixed factors of the original size of the original image. The compression standard used may allow progressive image reconstruction in resolution or decoding to a lower resolution.

The extraction module 310 decompresses the lowest resolution image from compressed data received from the compression module 306. The decompression is performed in accordance with prior art techniques for decompressing compressed image data. The method of decompression used is selected in accordance with the method for compression used, such as JPEG 2000 or other method that allows progressive image reconstruction in resolution or decoding to a lower resolution.

Any of the image compression server 204, transaction server 206, level determination module 302, scaling determination module 304, compression module 306 and scaling module 308 may be provided as individual modules, alone or in combination, and may, for example, be available as off-the-shelf software. The individual modules may be written in a programming language that is compatible with the image compression software. For example, the individual modules may be written in a language in which JPEG 2000 is written, such as C, C++, or JAVA™.

The client generating the client request 207 and the client receiving the requested image data 213 may be one and the same device or different devices, such as a display device or a printer device. The requesting and receiving client may each be remote from or local to the transaction server 206. The transaction server 206 may be remote from or local to the image compression server 204. Communication between the transaction server 206 and the image compression server 204, requesting client and receiving client may be via a wired or wireless communication devices, and which may be include in at least one network, such as a LAN, WAN, an intranet or the Internet.

The display device may be, for example, a computer display screen; a display screen of a handheld device, such as a personal digital assistant (PDA), cellular telephone, etc.; a consumer electronics device, etc. The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. The modality for marking may include, for example, applying toner, ink, dye, etc., to the substrate or embossing, peening, etching, etc. the substrate. The substrate may be a material such as paper, cardboard, a transparency, a paper derivative, metal, plastic, glass, wood, cloth, etc.

Operation of the level determination module 302 will now be described in greater detail. The level determination module 302 determines the number of resolution levels to be used upon compression of the input image so that the lowest resolution image satisfies a size constraint described by the target dimension data. More specifically, the level determination module 302 applies a function to the input dimension data and the target dimension data for computing the number of resolution levels. The actual function used may depend on the application, as described in the examples below.

An exemplary compression request based on the Kakadu tool in which the argument R of "Clevels" specifies the number of resolution levels in the compressed output image, is shown below:

```
kdu_compress -i input.pgm -o output.jp2 -rate 1 Clevels=R
Stiles={1024, 1024}
Corder=RLCP Cblk={64,64}
```

A function f(W,H) that computes R the number of resolution levels e.g., Clevels, can take one of many forms, depending on the application. The function f(W,H) is determined by obtaining W and H, which are the width and height, respectively of the input image, and computing $W/2^R$ and $H/2^R$, the size of the lowest resolution image, so that it satisfies a constraint. W and H may be provided in the compression request or derived from the input image itself.

The function f(W,H) may, for example, minimize the difference in area between the lowest resolution level image and a target image having dimensions $W_T \times H_T$ as follows:

$f(W,H)=R1$, where R1 is the value of R for which the
value $|(W \times H)/2^{2R}-(W_T \times H_T)|$ is minimized   (1)

In another example, the function f may select the resolution level that gives an image just larger than the target image as follows:

$$f(W,H)=\lfloor \log_2(\min(W/W_T, H/H_T)) \rfloor \qquad (2)$$

Or just smaller:

$$f(W,H)=\lceil \log_2(\max(W/W_T, H/H_T)) \rceil \qquad (3)$$

"Just larger" in this example means that both dimensions of the lowest resolution image are larger than the corresponding dimensions of the target image; and "just smaller" means they are both smaller. If f(W,H) is less than or equal to 0, then the original already has the desired size and may be compressed with resolution levels set to 0.

While the examples above of the f(W,H) use both the width and height of the original and target images to compute the number of resolution levels, there may actually be only a constraint on one of the target width or height. For example, if only the target width is specified, then the function that would set the resolution levels to give an image just wider than the target image is as follows:

$$f(W,H)=\lfloor \log_2(W/W_T) \rfloor \qquad (4)$$

or just narrower:

$$f(W,H)=\lceil \log_2(W/W_T) \rceil \qquad (5)$$

In the examples above, the size of the target image is explicitly known. The dimensions of the target make may also be specified implicitly by specifying that the resulting codestream be restricted to a given profile, such as Profile 1 or 0. Profile 1 and 0 are implementations of JPEG 2000 Core Coding that restrict the codestream for serving most commercial applications, as is familiar to those skilled in the art of JPEG 2000 core coding.

When a Profile 1 codestream is specified, an image no larger than 128×128 may be extracted from each tile and the f(W,H) is:

$$f(W,H)=\lceil \log_2(\max(W/128, H/128)) \rceil \qquad (6)$$

where W and H are the width and height of a tile. Similarly, when a Profile 0 codestream is specified, in which a single tile that is the same size as the image is produced, f(W,H) is determined in accordance with Equation (6).

Implementation of f(W,H) in the above Equations (6) provides for automatic generation of a codestream that meets the resolution level size constraints of a Profile 0 or 1 codestream.

Figure 4:
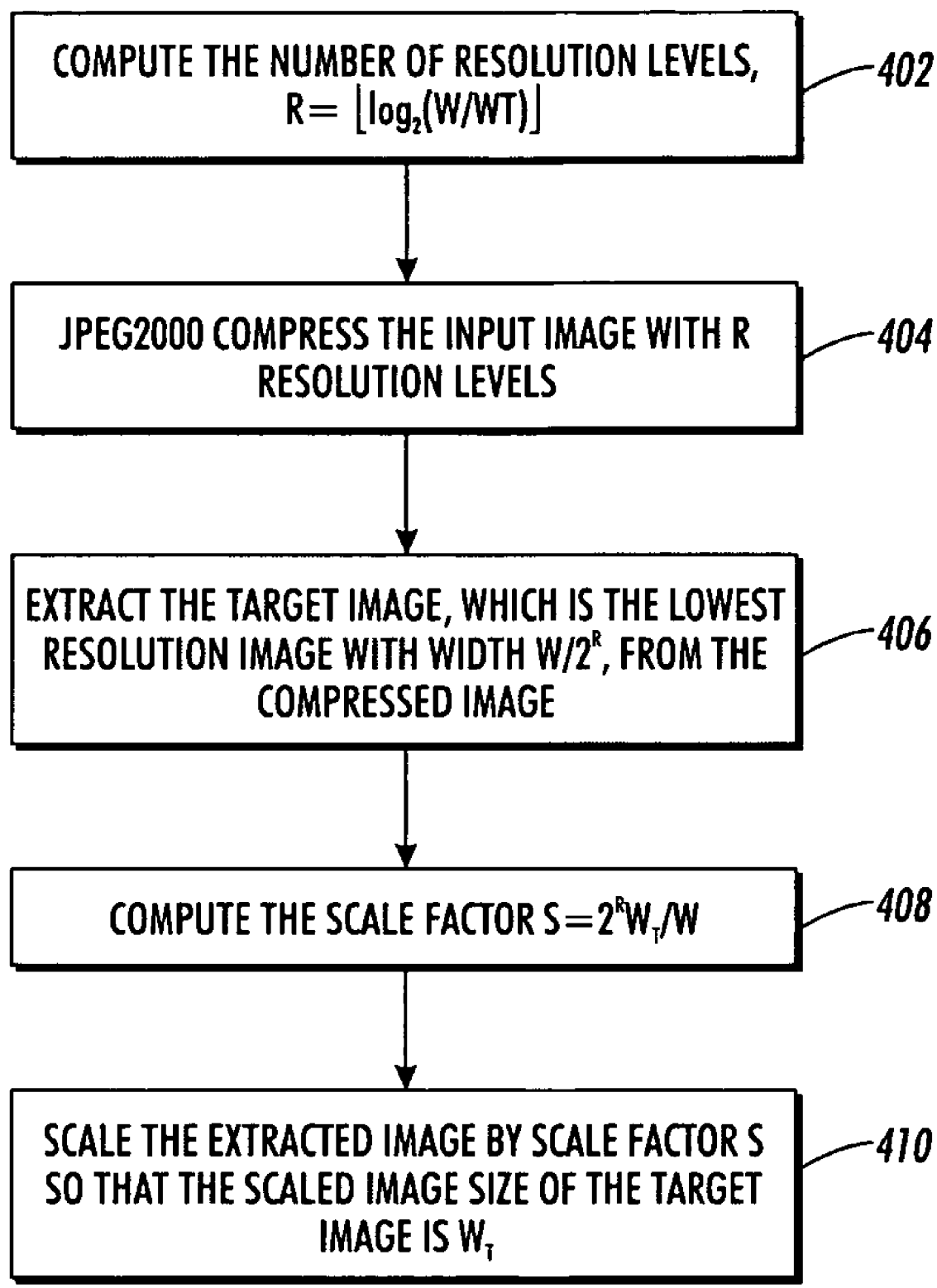
FIG. 4 is a flow diagram of exemplary steps performed by the image compression server shown in FIG. 3 in accordance with a first embodiment of the disclosure.

Operation of the scaling determination module 304 will now be described in greater detail. Even when selecting the number of resolution levels as a function of at least one dimension of the original image and at least one dimension of the target image, it may not be possible to achieve the exact at least one dimension of the target image by only selecting the resolution level. For example, when the original image has dimensions 1600 pixels by 1200 lines and it is required for the target image to have a 150-pixel width, if the number of resolutions levels is set to 3, then the compressed lowest resolution level image will be 200 pixels wide ($1600/2^3$); and if the number of resolution levels is set to 4, then the compressed lowest resolution level image will be 100 pixels wide ($1600/2^4$). In order to achieve a target image that has a width of 150 pixels, two approaches are provided below:

In the first approach, the original image is compressed using three resolution levels to produce a lowest resolution level compressed image that is 200 pixels width, which upon extraction, e.g., decompression of the lowest resolution level, is scaled by a scaling factor of 0.75 to produce an image that is 150 pixels in width (200 pixels*0.75=150 pixels). The sequence of steps for a method using the first approach for compressing an input image and producing a target image having a target width $W_T$ is shown in FIG. 4.

At step 402, the number of resolution levels, $R=\lfloor \log_2(W/W_T) \rfloor$, is computed by the level determination module 302. At step 404, the input image is JPEG2000 compressed with R resolution levels by the compression module 306. At step 406, the target image, which is the lowest resolution image with width $W/2^R$ is extracted from the compressed image by the extraction module 310. At step 408, the scale factor $S=2^R W_T/W$ is computed by the scaling determination module 310. At step 410, the extracted image is scaled by the scaling module 308 by scale factor S so that the scaled size of the target image is $W_T$. The steps above shown for the first approach may also be used for target dimension constraints other than only width, such as height, width or a function of height and width.

Figure 5:
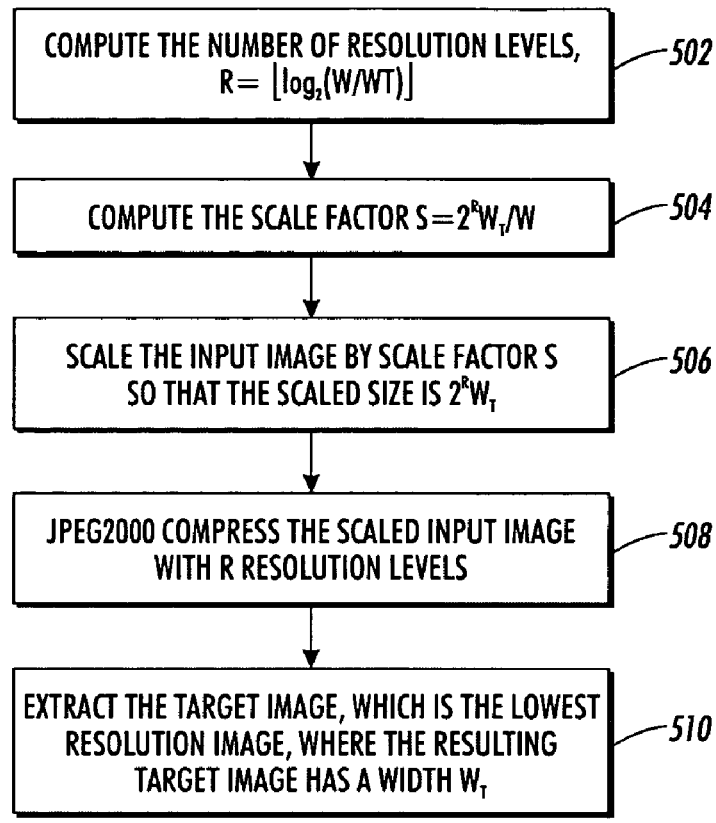
FIG. 5 is a flow diagram of exemplary steps performed by the image compression server shown in FIG. 3 in accordance with a second embodiment of the disclosure.

Using the second approach, the 1600×1200 original image is scaled by a scaling factor of 0.75, then the scaled original image is JPEG2000 compressed with 3 resolution levels. The resultant lowest resolution level image has a width of 150 pixels. The sequence of steps for a method using the second approach for compressing the input image and producing a target image having a target width $W_T$ is shown in FIG. 5.

At step 502, the number of resolution levels, $R=\lfloor \log_2(W/W_T) \rfloor$, is computed by the level determination level 302. At step 504, the scale factor $S=2^R W_T/W$ is computed by the scaling determination module 304. At step 506, the input image is scaled by the scale factor S so that the scaled size is $2^R W_T$ by the scaling module 308. At step 508, the scaled input image is JPEG2000 compressed with R resolution levels by the compression module 306. At step 510, the target image which is the lowest resolution image, is extracted by the extraction module 310, where the resulting target image has a width $W_T$. Step 510 may be omitted, and the scaled compressed input image may be provided to the client device as the requested image data 213, where extraction would be performed, for example, by the client device.

This sequence of steps corresponding to the second approach rounds $\log_2(W/W_T)$ down to the nearest integer value, so that the scaled image is smaller than the original. $\log_2(W/W_T)$ could also be rounded up, in which case the scaled image would be larger than the original. The preference here is for scaling down. This operation assumes that the original width is larger than the target width.

In accordance with the present disclosure a method is provided for automatically determining the number of resolution levels R and providing scaling based on the determined number of levels for producing a target image of lowest resolution that has a target dimension. The target dimension may be, for example, width, height or combination thereof (e.g., a function, such as a product, of width of height). The target dimension may be described as an absolute value, relative value (e.g., relative to a dimension of a target substrate, height relative to width, relative to a dimension of another image, relative to an external value, etc). The target dimension may also be described in terms of range.

The methods of the disclosure may be applied to use in batch operations, where each image i in the batch may have a different original size $W_i$ and a different desired size for the lowest resolution image $(W_T)_i$, or $W_i$ and/or $(W_T)_i$ may be the same for all of the images i. For example, a first image may be compressed so that the lowest resolution level target image is VGA size and a second so that the lowest resolution level target image is XVGA size. The target sizes may be included with the client request 207, or may be obtained, for example, by referring to a data structure, such as a worksheet or file that associates a set of target dimension data with an identifier, such as a name for a file holding an input image, for each image in the batch being processed.

Figure 6:
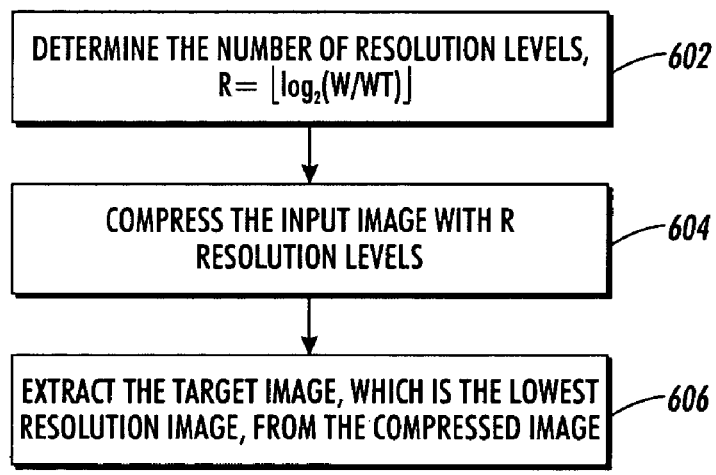
FIG. 6 is a flow diagram of exemplary steps performed by the image compression server shown in FIG. 3, in accordance with a third embodiment of the disclosure.

The sequence of steps for a method using a third approach for compressing the input image in which scaling is not performed is shown in FIG. 6. At step 602, the number of resolution levels, e.g., $R=\lfloor \log_2(W/W_T) \rfloor$ or $R=\lceil \log_2(W/W_T) \rceil$, is computed by the level determination module 302. At step 604, the input image is JPEG2000 compressed with R resolution levels by the compression module 306. At step 406, the target image, which is the lowest resolution image with width $W/2^R$ is extracted from the compressed image by the extraction module 310. The steps above shown for the third approach may also be used for target dimension constraints other than only width, such as height, width or a function of height and width. Step 606 may be omitted, and the compressed input image may be provided to the client device as the requested image data 213, where extraction would be performed, for example, by the client device.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for compressing digital images, comprising:
   receiving by a tangible processor an input image having a dimension d and a target dimension constraint $d_t$;
   determining by the processor a number of resolution levels R for generating an image having corresponding dimension $d_r$, wherein the difference between $d_r$ and $d_t$ is less than the difference between $d_r$ and the corresponding dimension of an image compressed at the next or the previous resolution level;
   determining by the processor a scale factor S as a function of R and the dimension d of the input image;
   scaling by the processor the input image in accordance with the scale factor S; and
   compressing by the processor the scaled input image with the R resolution levels for producing a compressed image including a lowest resolution image, wherein the lowest resolution image has a corresponding dimension that is substantially the same as $d_t$.

2. The method according to claim 1, wherein $d_t$ includes a function of two dimensions $d_1$ and $d_2$, and $d_r$ includes a corresponding function of two dimensions corresponding to $d_1$ and $d_2$.

3. The method according to claim 1, wherein determining R includes determining $(\log_2(d/d_t))$.

4. The method according to claim 1, wherein determining S includes determining $(2^R d_t/d)$.

5. The method according to claim 1, wherein the method further comprises using a JPEG2000 image compression standard.

6. The method according to claim 1, wherein the resolution levels are hierarchical.

7. The method according to claim 1, wherein the method further comprises using a compression standard that implements wavelet transformations.

8. A processor assembly for compressing digital images, comprising:
a processor; and
an image compression server module having a series of programmable instructions executable by the processor for receiving an input image having a dimension d and a target dimension constraint $d_t$, the image compression server module comprising:
a first module having a series of programmable instructions executable by the processor for determining a number of resolution levels R for generating an image having corresponding dimension $d_r$, wherein the difference between $d_r$ and $d_t$ is less than the difference between $d_r$ and the corresponding dimension of an image compressed at the next or the previous resolution level;
a second module having a series of programmable instructions executable by the processor for determining a scale factor S as a function of R and the dimension d of the input image;
a third module having a series of programmable instructions executable by the processor for scaling the input image in accordance with the scale factor S; and
a fourth module having a series of programmable instructions executable by the processor for compressing the scaled input image with the R resolution levels for producing a compressed image including a lowest resolution image, wherein the lowest resolution image has a corresponding dimension that is substantially the same as $d_t$.

9. The processor assembly according to claim 8, wherein $d_t$ includes a function of two dimensions $d_1$ and $d_2$, and $d_r$ includes a corresponding function of two dimensions corresponding to $d_1$ and $d_2$.

10. The processor assembly according to claim 8, wherein the first module for determining R determines $(\log2(d/d_t))$.

11. The processor assembly according to claim 8, wherein the second module for determining S determines $(2R\, d_t/d)$.

12. The processor assembly according to claim 8, wherein the third module for compressing compresses using a JPEG2000 image compression standard.

13. The processor assembly according to claim 8, wherein the resolution levels are hierarchical.

14. The processor assembly according to claim 8, wherein the third module for compressing uses a compression standard that implements wavelet transformations.

15. A system for compressing digital imaging comprising:
a processor assembly for compressing digital images, comprising:
a processor; and
a transaction server module having a series of programmable instructions executable by the processor for receiving from a client device a client request to compress an image;
an image compression server module having a series of programmable instructions executable by the processor for receiving from the transaction server module an input image having a dimension d and a target dimension constraint $d_t$, the image compression server module comprising:
a first module having a series of programmable instructions executable by the processor for determining a number of resolution levels R for generating an image having corresponding dimension $d_r$, wherein the difference between $d_r$ and $d_t$ is less than the difference between $d_r$ and the corresponding dimension of an image compressed at the next or the previous resolution level;
a second module having a series of programmable instructions executable by the processor for determining a scale factor S as a function of R and the dimension d of the input image;
a third module having a series of programmable instructions executable by the processor for scaling the input image in accordance with the scale factor S; and
a fourth module having a series of programmable instructions executable by the processor for compressing the scaled input image with the R resolution levels for producing a compressed image including a lowest resolution image, wherein the lowest resolution image has a corresponding dimension that is substantially the same as $d_t$, wherein the compressed scaled image is provided to the transaction server which provides the client device with access to the compressed image.

16. The system according to claim 15, wherein $d_t$ includes a function of two dimensions $d_1$ and $d_2$, and $d_r$ includes a corresponding function of two dimensions corresponding to $d_1$ and $d_2$.

17. The system according to claim 15, wherein the first module for determining R determines $(\log2(d/d_t))$.

18. The system according to claim 15, wherein the second module for determining S determines $(2R\, d_t/d)$.

19. The system according to claim 15, wherein the third module for compressing compresses using a JPEG2000 image compression standard.

20. The system according to claim 15, wherein the resolution levels are hierarchical.

21. The system according to claim 15, wherein the module for compressing uses a compression standard that implements wavelet transformations.

* * * * *